(12) United States Patent
Mulligan

(10) Patent No.: US 7,798,579 B2
(45) Date of Patent: Sep. 21, 2010

(54) ENDLESS TRACK CHAIN ASSEMBLY WITH IN SITU REPLACEMENT WEAR PARTS

(75) Inventor: Patrick J. Mulligan, Dubuque, IA (US)

(73) Assignee: Deere & Company, Moline, IL (US)

( * ) Notice: Subject to any disclaimer, the term of this patent is extended or adjusted under 35 U.S.C. 154(b) by 124 days.

(21) Appl. No.: 11/846,557

(22) Filed: Aug. 29, 2007

(65) Prior Publication Data

US 2009/0058182 A1      Mar. 5, 2009

(51) Int. Cl.
*B62D 55/12*    (2006.01)
*B62D 55/21*    (2006.01)

(52) U.S. Cl. .................... 305/199; 305/193; 305/196; 305/201

(58) Field of Classification Search ........... 305/136, 305/137, 160, 161, 184, 185, 187, 191, 193, 305/194, 195, 196, 197, 198, 199, 200, 201; 474/161, 162
See application file for complete search history.

(56) References Cited

U.S. PATENT DOCUMENTS

| | | | | |
|---|---|---|---|---|
| 1,390,198 | A * | 9/1921 | Fossati | 74/460 |
| 3,069,922 | A * | 12/1962 | Harvey | 474/162 |
| 3,601,454 | A * | 8/1971 | Reinsma | 305/105 |
| 3,680,929 | A * | 8/1972 | Hnilicka et al. | 305/201 |
| 3,913,986 | A * | 10/1975 | Schaffner | 305/195 |
| 3,960,412 | A * | 6/1976 | Shuler | 305/199 |
| 3,996,814 | A * | 12/1976 | Westlake | 474/162 |
| 4,159,857 | A * | 7/1979 | Purcell | 305/187 |
| 4,306,753 | A * | 12/1981 | Livesay et al. | 305/201 |
| 4,752,281 | A * | 6/1988 | Lammers | 474/162 |
| 4,759,740 | A | 7/1988 | Cradduck | 474/212 |
| 5,183,318 | A | 2/1993 | Taft et al. | 305/39 |
| 5,203,861 | A | 4/1993 | Irwin et al. | 474/161 |
| 6,025,062 | A * | 2/2000 | Krenkel et al. | 428/293.4 |
| 6,220,378 | B1 * | 4/2001 | Oertley et al. | 180/9.62 |
| 6,386,654 | B1 * | 5/2002 | Singer et al. | 305/194 |

* cited by examiner

*Primary Examiner*—S. Joseph Morano
*Assistant Examiner*—Kip T Kotter
(74) *Attorney, Agent, or Firm*—Taylor IP, PC

(57) ABSTRACT

An endless track chain assembly for an endless track vehicle having drive teeth received in tapered slots in a drive wheel. The drive teeth are replaceable in situ by a movement in a direction parallel to the rotational axis of the drive wheel. The drive teeth inter-fit with tapered inserts on the endless chain assembly so that all the driving forces are transmitted between the two replaceable wear elements. The inserts are inter-connected with pairs of links in a three point mounting as a structural unit to increase torsional rigidity and enable bushings that inter-connect adjacent links to be smaller that conventional bushings. The inserts on the endless chain assembly are readily replaceable by fasteners accessed from the exterior of the endless chain assembly.

18 Claims, 6 Drawing Sheets

ENDLESS TRACK CHAIN ASSEMBLY WITH IN SITU REPLACEMENT WEAR PARTS

FIELD OF THE INVENTION

The invention relates to endless track vehicles and more specifically to endless track chain assemblies used with such vehicles.

BACKGROUND OF THE INVENTION

Endless track vehicles have been used since the beginning of the 1900's, both for military and for construction activities. Endless track vehicles may have a belt in the case of light duty, but for heavy duty applications the endless tracks are made of a number of rigid units that are pivotally joined to each other in a pair of endless tracks. Drive wheels at one end of the vehicle apply force to the tracks to move the endless track vehicle over the ground. Differential speeds on the tracks provide a directional capability.

Such heavy duty endless track assemblies are subjected to substantial wear and tear going to the nature of the environment in which they operate. As a result, wear on the endless track eventually requires that the track be rebuilt and refurbished. Conventional endless track assemblies have individual track units pivoted to one another by what are known as bushings. These bushings also take the torque forces from the drive wheel and transfer them to the endless track. Such action causes a wear in the outer housing for the bushing, necessitating a rather substantial and skilled repair and, in many cases, transport of the endless track to a repair shop for replacement of worn components. A further complication of such an arrangement is that bushings which, are normally lubricated and sealed, have the seals broken when the repair and refurbishing operation occurs, thereby raising the possibility of contamination of the lubricant.

Therefore, a need exists in the art for an easily repairable endless track assembly that avoids the above problems.

SUMMARY OF THE INVENTION

In one form, the invention is an endless track chain assembly having at least one drive wheel and an endless track chain inter-engaging with the drive wheel to be guided and driven by the drive wheel. The components on the drive wheel and the endless track chain that engage one another are replaceable in situ.

In another form the invention is an endless track vehicle having a frame, a prime mover mounted in the frame and a power transmission assembly receiving the output of the prime mover. At least a pair of drive wheels are connected to the power transmission for providing a torque output, the drive wheels being positioned on the opposite sides of the vehicle. Endless track chain assemblies each having an endless track chain inter-engage with the drive wheels to be guided and driven by the drive wheels. The components on the drive wheels and the endless track chain that engage one another are replaceable in situ.

DETAILED DESCRIPTION OF THE INVENTION

Figure 1:
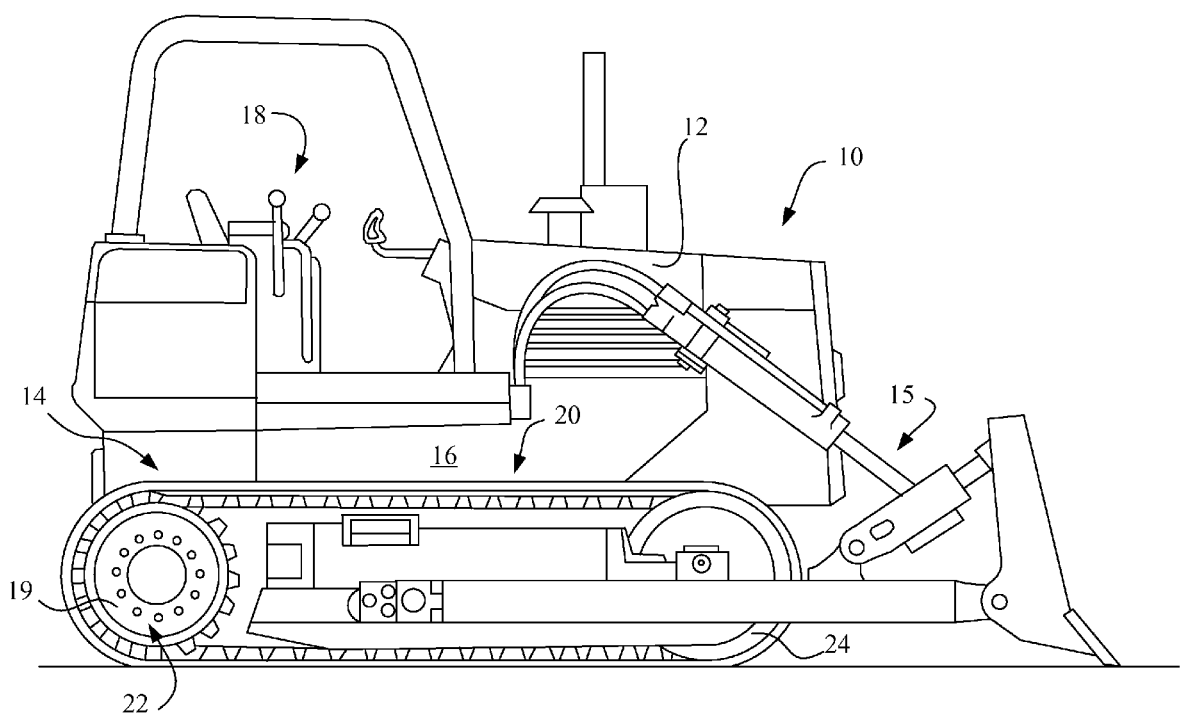
FIG. 1 is a simplified drawing of an endless track vehicle with which the present invention may be used.

FIG. 1 shows an endless track vehicle 10 having a prime mover generally indicated by reference character 12. Prime mover 12 is usually a compression ignition, or diesel, engine because of its inherent fuel efficiency and long term durability. The output of prime mover 12 is connected to a power transmission generally indicated by reference character 14. Power transmission 14 has rotary outputs on opposite sides of the vehicle to provide bi-directional controlled torque output. A frame 16 provides the structural foundation for the prime mover 12, power transmission 14 and provides an operator station 18 wherein an operator can operate the endless track vehicle 10, including accessories such as a scraper assembly 15. The frame 16 also supports an endless track chain assembly 20 that has drive wheels, generally indicated by reference character 22, connected to the output of power transmission 14 through a hub 19 and idler wheels 24 at the opposite end of the endless track assembly 20. It should be noted that a variety of guide wheels and other components enabling accurate tracking of the endless chain assembly 20 may be provided. These are not shown in an effort to simplify the understanding of the invention.

Figure 2:
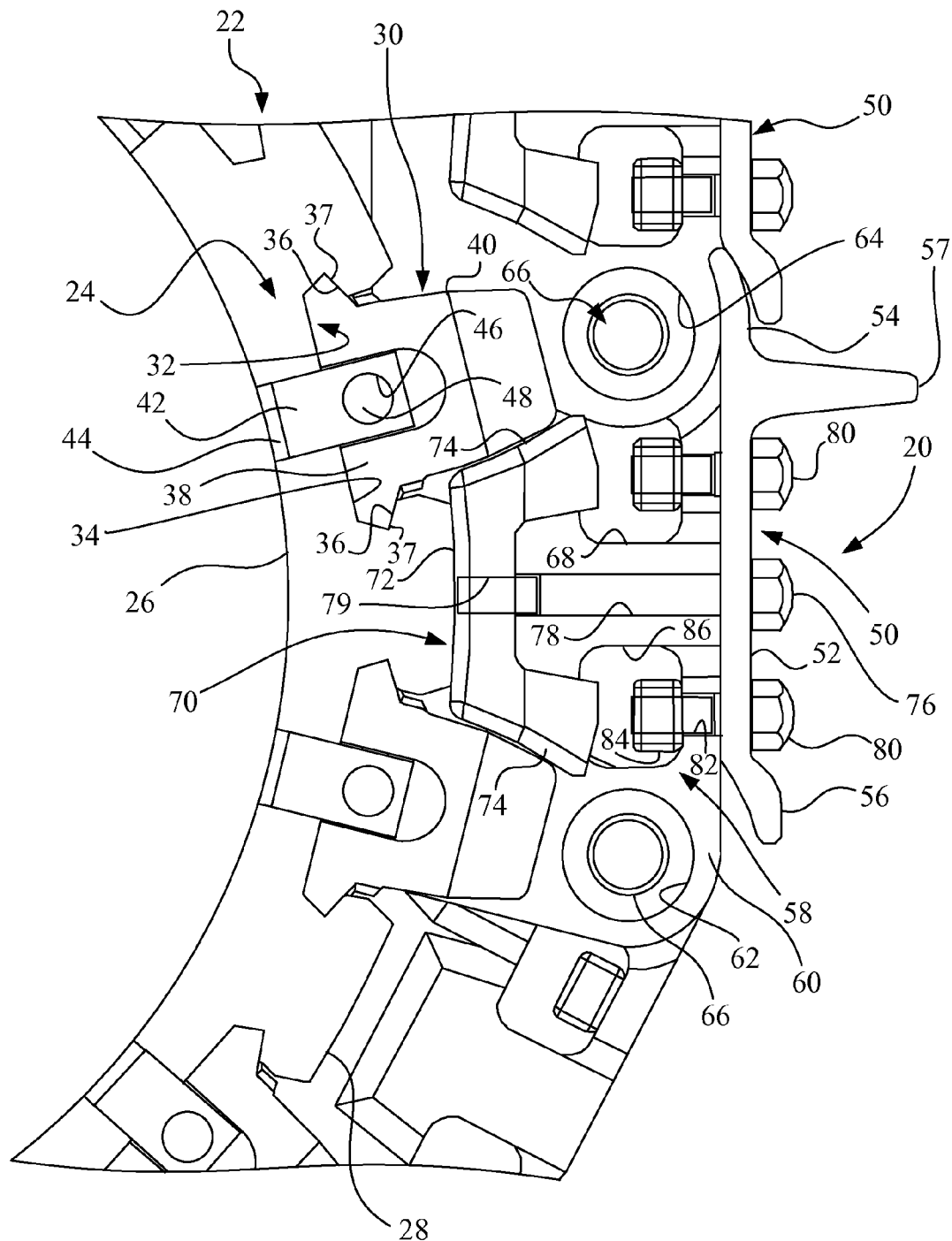
FIG. 2 is an enlarged side view of an endless track chain assembly used in FIG. 1.
Figure 3:
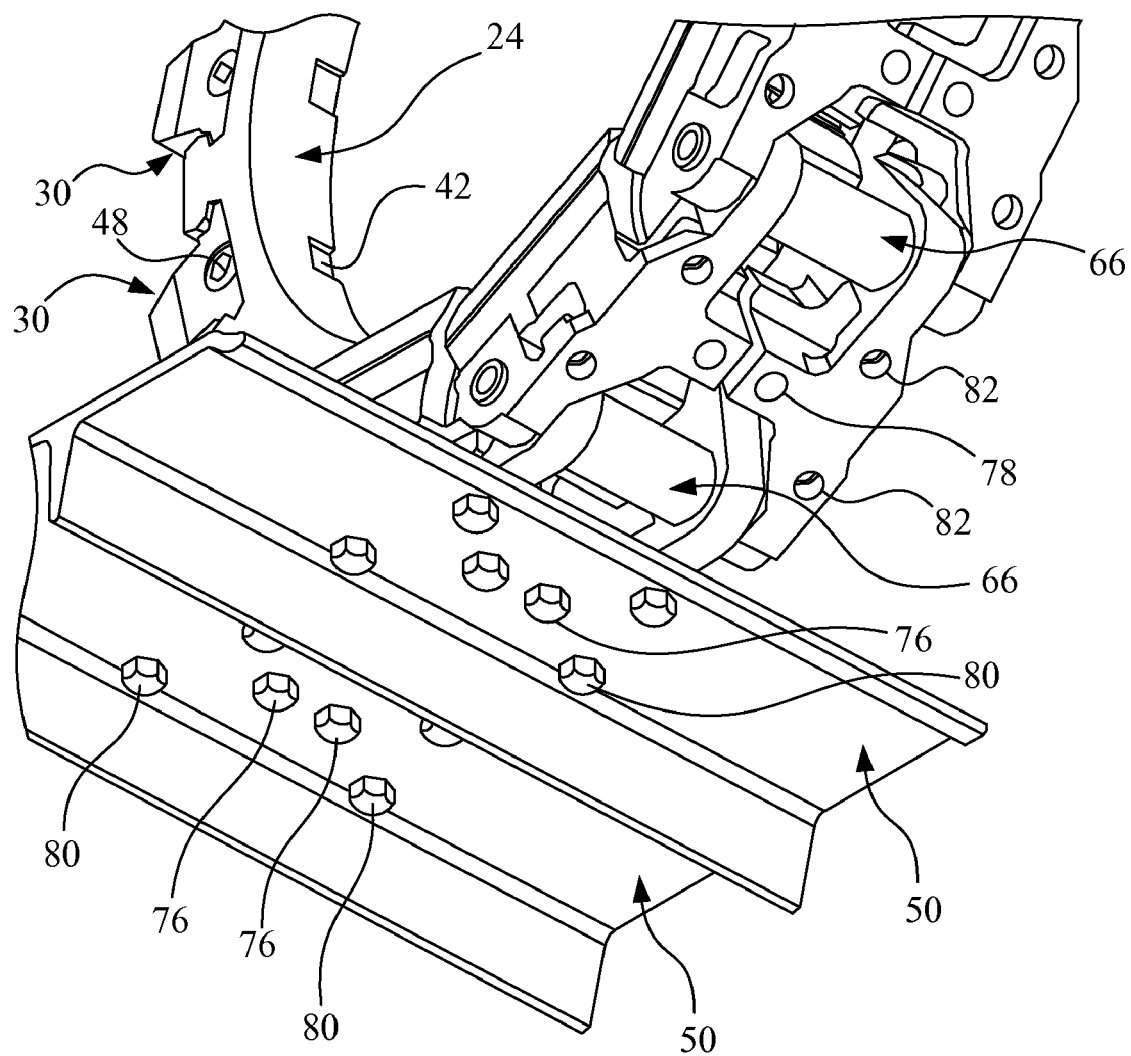
FIG. 3 is a bottom perspective view of the chain assembly of FIG. 2.
Figure 4:
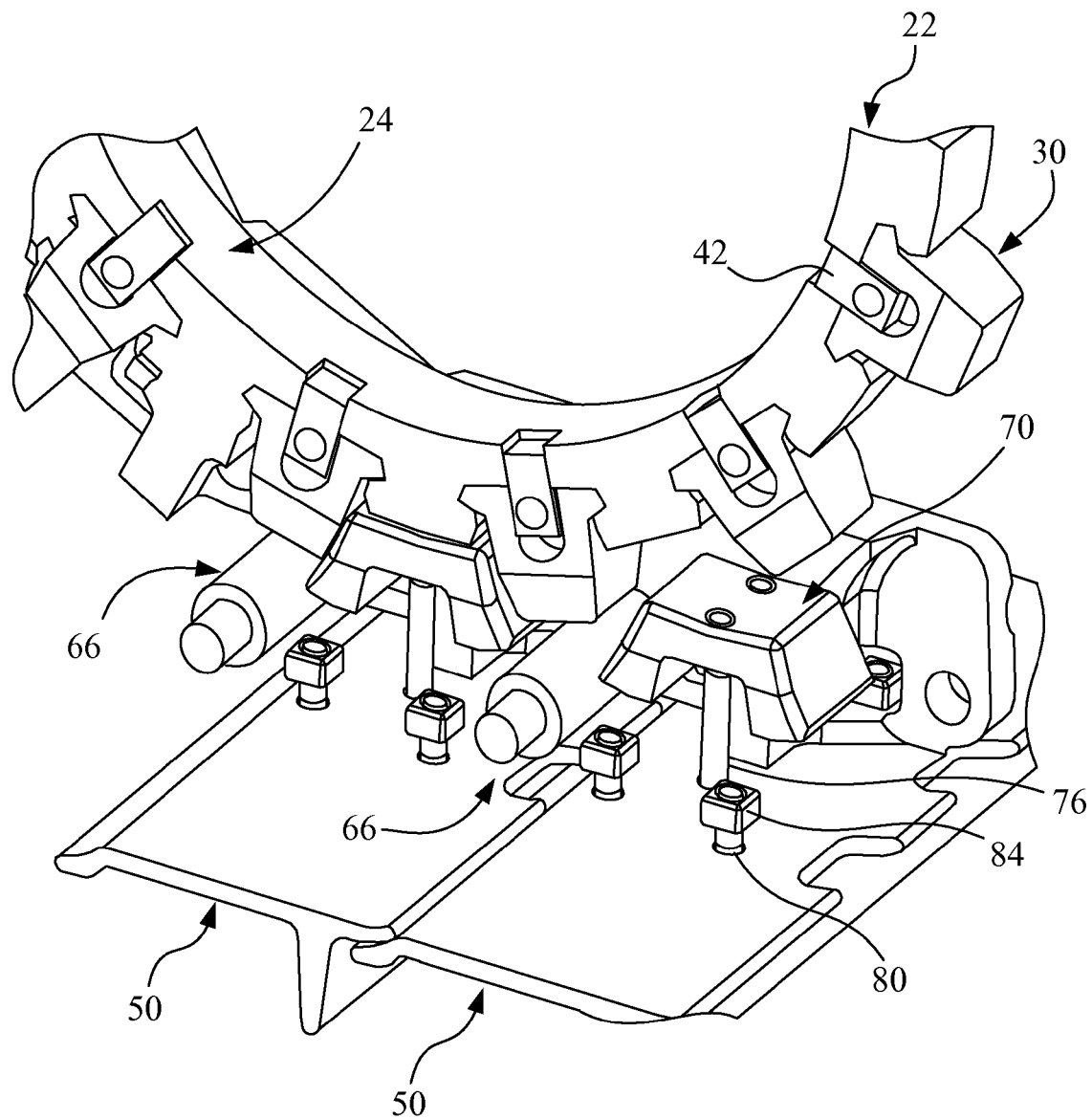
FIG. 4 is an elevational perspective view of the chain assembly of FIG. 4 with some of the components removed.
Figure 4A:
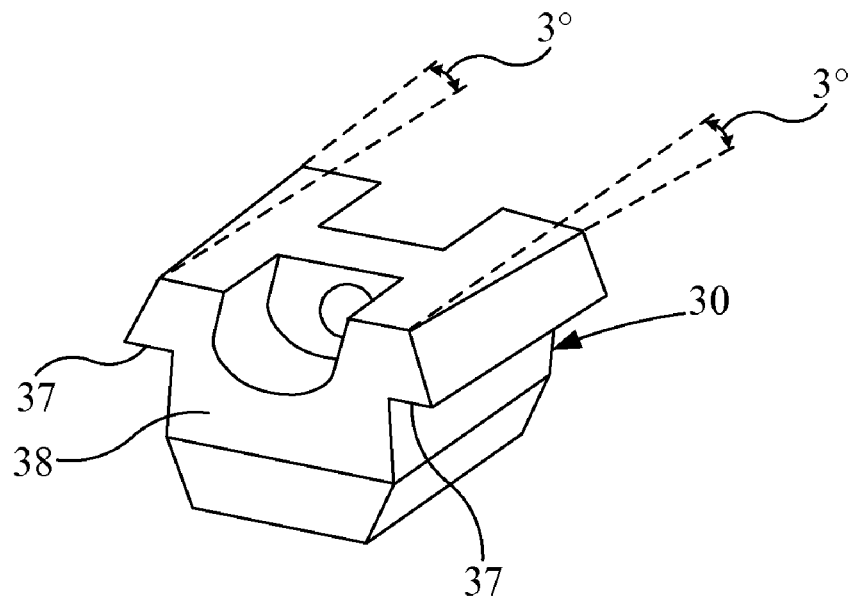
FIG. 4A is a perspective view of a drive tooth of FIG. 4 illustrating its tapered configuration.
Figure 4B:
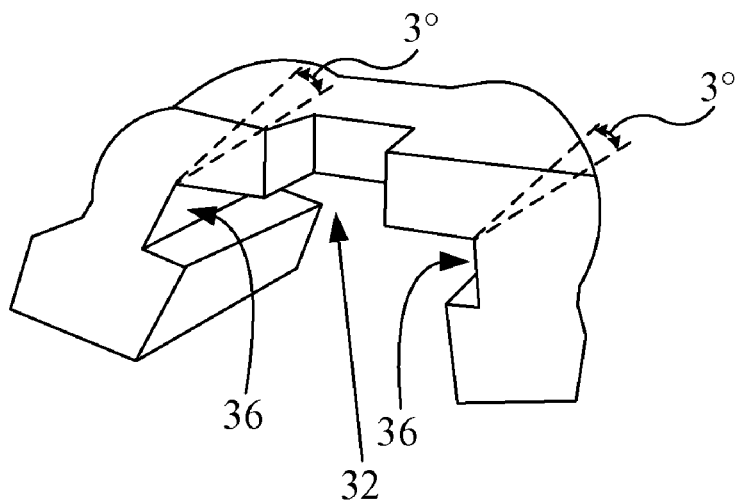
FIG. 4B is a perspective view of the mating part for the tooth of FIG. 4A.
Figure 5:
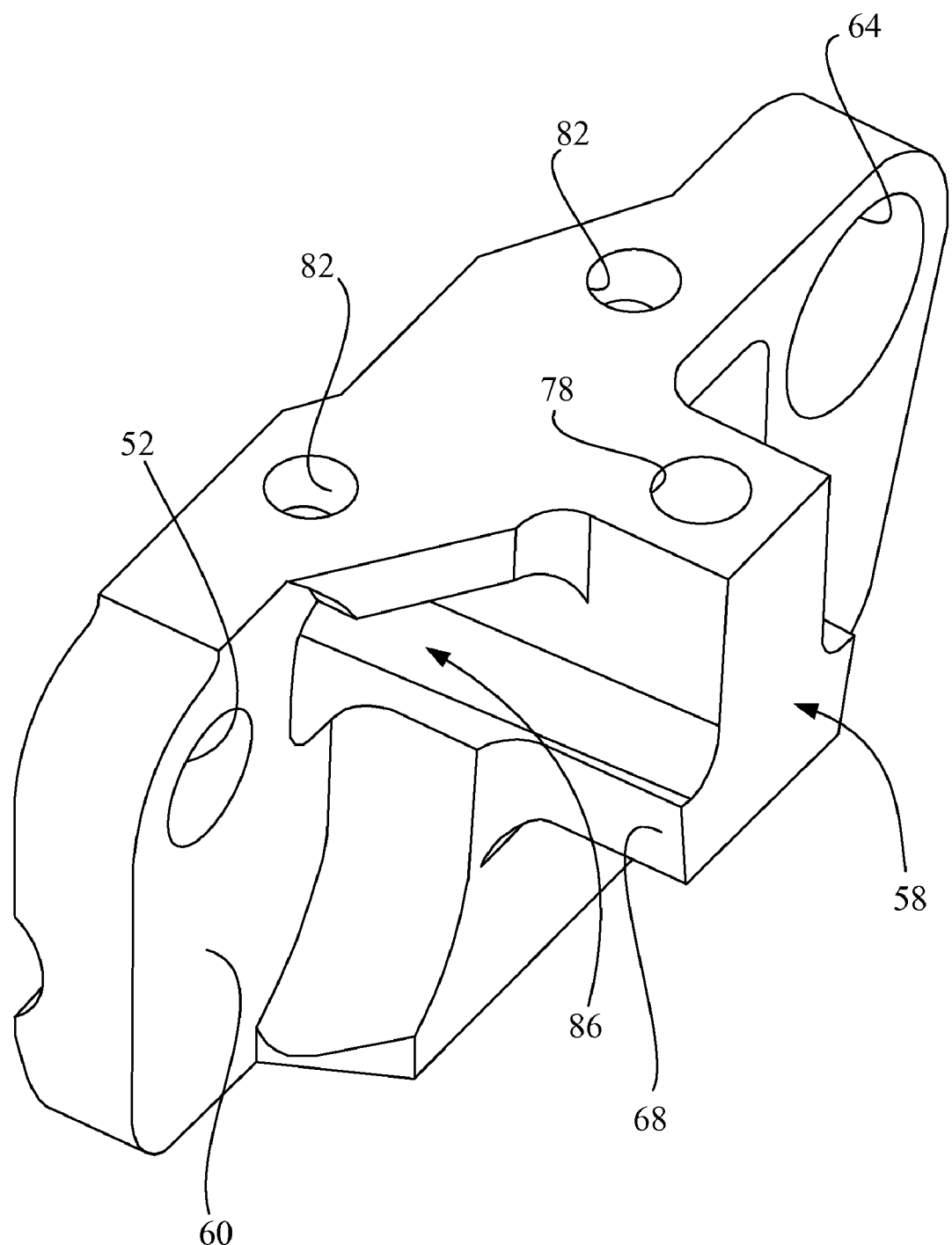
FIG. 5 is a perspective view of a link incorporated in the endless track chain assembly of FIGS. 2, 3, and 4.

The endless track assembly 20 is shown in an enlarged view shown in FIG. 2 and the views of FIGS. 3, 4 and 5. The drive wheel 22 includes a central hub 19 (not shown in FIG. 2) which is attached to the power transmission 14 by appropriate removable fasteners. A circular rim 24 is attached to the hub 19 by various means including heat shrinking onto an outer circumference of hub 19. Rim 24 has an inner diameter 26 and an outer diameter 28. A plurality of drive teeth 30 are received in slots 32 formed in the periphery of rim 24. Slots 32 have a base 34 and corresponding recesses 36 on opposite sides of base 32. The recesses 36 receive corresponding extensions 37 of a base 38 for each tooth 30. The drive portion 40 of tooth 30 extends radially outward from base 38 and its flank may be formed as an involute to provide a quieter running drive with fewer pulsations inherent with present drive tooth chain geometry. The slot 32 enables removal and insertion of tooth 30 in a direction parallel to the central axis of drive wheel 22. The slot 32 defines a stop for fixing the radial and axial position of tooth 30 and, as illustrated, this involves a slight taper to slot 32 in a direction parallel to the rotational axis of drive wheel 22. A taper of three degrees may be employed, but other taper angles may be selected for particular applications. As illustrated in FIG. 2, the small end of slot 32 is illustrated with the larger end of the slot 32 at the opposite side of the hub or the rim 24. In order to pull tooth 30 into place, a tab 42 is received in a recess 44 in rim 24. Fig. 4A shows the taper for extensions 37 of base 38, in exaggerated fashion, which mate with corresponding tapers in the recesses 36 of slots 32 shown in Fig. 4B. Tab 42 has a central threaded hole 46 that receives a screw 48, the head of which extends towards the plane of FIG. 2 from the opposite side. As will be illustrated below, screw 48 is tightened to pull the opposite face of tooth 30 towards the plane of the FIG. 2 to position it axially relative to rim 24 by abutting extensions 37 of base 38 in the recesses 36 of slots 32. It should be apparent to those skilled in the art that other arrangements may be employed to set the axial position of drive teeth 30. As is illustrated in FIG. 2, a plurality of drive teeth 30 are positioned around the periphery of rim 24 to provide a guiding and driving function to the endless chain 20.

Endless chain 20 includes a series of ground engaging shoes 50 having a base plate 52 with leading and trailing sections 54 and 56 beveled to inter-fit with adjacent shoes 50. A downward directed rib 57, integral with base plate 52, may be employed to enhance traction. Each shoe 50 has a link 58 on either side of the shoe 50. In the view shown in FIG. 2, the near side link has been removed to enable a clearer understanding of the invention. The links 58 have a sidewall 60 having a first through hole 62 and second through hole 64 to receive bushing assemblies 66 that provide a means for pivotally interconnecting adjacent links 58. Bushing assemblies 66 are in usual form with a central lubrication system so the details of such system are not shown to enable a better focus on the invention. However, because of the novel construction of the links 58, the diameters of the bushing assemblies 66 are smaller than on prior art systems that use the bushing assemblies to transfer torque from a drive wheel to an endless track assembly.

Links 58 have a center portion 68 in the form of a structural bridge extending at right angles to the plane of link 58, as particularly shown in FIG. 5. As viewed in FIG. 2, the bridge 68 extends out of the plane of the figure. Pairs of links 58 have corresponding bridges 68 that form a structural support for an insert 70. Insert 70 has an inner surface 72 and tapered end surfaces 74 that correspond to interfit with teeth 30. Insert 70 is approximately the width of each tooth 30 so that driving engagement occurs between tooth 30 and insert 70. Insert 70 is secured to adjacent bridges 68 by screws 76 extending through shoe 50 through a bore 78 in bridge 68 and threadedly engaging insert 70 at threaded section 79. The insert 70 is secured to pairs of bridges 68 by pairs of screws 76. The base of link 58 is secured to shoe 50 by screws 80 extending through shoe 50 and through bores 82 to be received in nuts 84 positioned within openings 86 in link 58. The openings 86 not only provide access to nut 84 but provide sufficiently large evacuation openings for removal of debris that is trapped in the interstices of chain assembly 20. As shown particularly in FIGS. 3, 4 and 5, the arrangement of the screws 76 and 80 through bores 78 and 82, respectively provide a triangular structural support between the shoes 50, the links 58 and inserts 70. This triangular structural interconnection substantially increases the rigidity of the structure and enables a reduction in the diameter of bushings 66 since they only provide a pivotal interconnection between adjacent rings and do not contact the drive teeth 30, particularly shown in FIGS. 2 and 4.

The endless chain assembly described above has easily replaceable elements for the wear parts. These elements constitute the teeth 30 and the inserts 70. They are easily replaceable in situ by a operator having normal technical skills, as described below and therefore can be formed from standard materials using ordinary heat treatments or material composition. When the wear elements need to be replaced in situ, or in the field, the drive wheel 22 is rotated so that the teeth 30 are free from the inter-engagement with the endless chain 20. In that position, which is generally from 2 o'clock to 4 o'clock as shown in FIG. 1, the screws 48 are disengaged and the teeth axially displaced in the direction of the more open portion of slot 32. A replacement tooth 30 is then inserted in the slot 32, the screw 48 threaded into tab 42, and tightened to pull the tooth against the stop provided by the taper within slot 32 and the extensions 37 of base 38. When the necessary teeth 30 are replaced, the corresponding inserts 70 may be replaced by positioning them in the uppermost position between drive wheel 22 and idler wheel 24. Because screws 76 are accessible from the exterior of shoes 50, it is an easy and straightforward procedure to disconnect insert 70 and replace it with a new insert as needed. It should be apparent to those skilled in the art that this procedure may be performed without any special tools by a standard mechanic in the field.

Thus it is seen that the drive wheel 22 and endless track assembly have wear parts that are totally replaceable in the field without any special equipment such as presses or other devices. The replacement of the wearable teeth 30 and inserts 70 is done without disturbing the bushings 66 and associated lubrication system. Accordingly, the life of the bushings 66 is extended significantly beyond the life of a standard bushing assembly that receives torsional driving forces between the drive wheel and the endless track assembly. It should also be noted that the inner surface 72 of the insert 70 would ride on the outer diameter of the idler wheel 24, thus further reducing scalloping of the endless chain assembly.

By providing a side insertion of the replaceable teeth 30, the inner diameter 26 of rim 24 is maximized to provide a greater outer diameter for the hub 19.

Having described the preferred embodiment, it will become apparent that various modifications can be made without departing from the scope of the invention as defined in the accompanying claims.

The invention claimed is:

1. An endless track chain assembly comprising:
   at least one drive wheel comprising a wheel rim, said wheel rim having a plurality of slots;
   an endless track chain inter-engaging with said drive wheel to be guided and driven by said drive wheel;
   a plurality of teeth on said drive wheel engaging said endless tracks each tooth having a base received in and abutting said slot, said base and slot being tapered to fix said teeth in place radially and axially, said teeth being configured to be replaceable in situ in a direction parallel with the rotational axis of said drive wheel,
   a tab engageable between said rim and each said tab to pull said tooth into said slot wherein the taper of said slot in said rim has a larger and smaller dimension, and said rim has a recess on the side of the rim having the smaller dimension for said slot and wherein said tab is received in said recess and is engageable with said tooth to pull said tooth against said tapered slot, and
   a screw extending through each said tooth and engaging with said tab for urging said tooth against said taper.

2. An endless track chain assembly as claimed in claim 1, wherein said recess has a three degree taper.

3. An endless track chain assembly as claimed in claim 1, wherein said endless track chain has a plurality of inserts releasably engageable therewith and positioned to abut and inter-engage with the teeth on said drive wheel.

4. An endless track chain assembly as claimed in claim 3, wherein said endless track comprises a plurality of pairs of links pivotally inter-engageable with one another, said insert being positioned between said pairs of links.

5. An endless track chain assembly as claimed in claim 4, wherein said links are provided in pairs and have a center section forming at least a portion of a bridge therebetween, said insert being positionable over said bridge.

6. An endless track chain assembly as claimed in claim 5, wherein said insert is maintained against said bridge by at least two removably connectable fasteners.

7. An endless track chain assembly as claimed in claim 6, wherein said insert has an inner surface generally conforming to the outer diameter of said drive wheel and integral tapered end sections wherein the teeth on said drive wheel engage the tapered section between adjacent inserts.

8. An endless track chain assembly as claimed in claim 6, further comprising shoes connectable to said bridges, said bridges being fastened to said shoes by said at least a pair of fasteners, said bridge having a fastener to connect said shoe and bridge and insert as a unitary element.

9. An endless track chain assembly as claimed in claim 8, wherein said fasteners are screws accessible from the base of said shoe for easy removal.

10. An endless track vehicle comprising:
a frame;
a prime mover mounted in said frame;
a power transmission assembly to receive the output of said prime mover;
at least a pair of drive wheels each comprising a rim having a plurality of slots, each drive wheel connected to said power transmission for providing a torque output, said drive wheels being positioned on opposite sides of said vehicle;
an endless track chain assembly comprising an endless track chain inter-engaging with said drive wheels to be guided and driven by said drive wheel and a plurality of teeth on said drive wheel engaging said endless track chain, each tooth having a base received in a corresponding slot, said base and slot being tapered to fix each said teeth in place radially and axially and configured to be replaceable in situ in a direction parallel with a rotational axis of said drive wheel,
tabs engageable between said rim and said tabs to pull said teeth into said slots;
wherein the taper of said slots have a larger and smaller dimension and said rim has recesses on the side of the rim having the smaller dimension for said slots and wherein said tabs are received in said recesses and engageable with said teeth to pull said teeth against said tapered slots, and
screws extending through said teeth and engaging with said tabs for urging said teeth against said tapers.

11. An endless track vehicle as claimed in claim 10, wherein said slot and said base have a three degree taper.

12. An endless track vehicle as claimed in claim 10, wherein said endless track chain has a plurality of inserts releasably engageable therewith and positioned to abut and contact the teeth on said drive wheel.

13. An endless track vehicle as claimed in claim 12, wherein said endless track comprises a plurality of links pivotally inter-engageable with one another, said insert being positioned between said links.

14. An endless track vehicle as claimed in claim 13, wherein said links are provided in pairs and have a center section forming at least a portion of a bridge therebetween, said insert being positionable over said bridge.

15. An endless track vehicle as claimed in claim 14, wherein said insert is maintained against said bridge by at least two removably connectable fasteners.

16. An endless track vehicle as claimed in claim 15, wherein said insert has an inner surface generally conforming to outer diameter of the drive wheel and end sections being tapered from said center section, the tapered sections of adjacent inserts being abuttable and inter-engageable with the teeth on said drive wheel.

17. An endless track vehicle comprising:
a frame;
a prime mover in said frame;
a power transmission assembly to receive the output of said prime mover;
at least a pair of drive wheels each comprising a rim having slots, each defining a stop and connected to said power transmission for providing torque output, said drive wheels being positioned on opposite sides of said vehicle;
an endless track chain assembly comprising and endless track chain having a plurality of links inter-engaging with one another and said drive wheel to be guided and driven by said drive wheel and a plurality of teeth on said drive wheel engaging said endless track chain and having a base received in said slots and abutting said slots to hold said teeth and configured to be replaceable in situ in a direction parallel with a rotational axis of said drive wheel;
a plurality of inserts releaseably engageable therewith and positioned to abut and contact the teeth on said drive wheel, said inserts being positioned between said links,
said links being provided in pairs having a center section forming at least a portion of a bridge therebetween, said insert being positionable over said bridge by at least two removeably connected fasteners, and;
shoes connectable to said links, said links being fastened to said shoes by said at least two fasteners extending through said bridge to connect said shoe and bridge and insert as a unitary element.

18. An endless track vehicle as claimed in claim 17, wherein said fasteners are screws accessible from the base of said shoe.

* * * * *